(12) United States Patent
Yopp et al.

(10) Patent No.: US 7,447,592 B2
(45) Date of Patent: Nov. 4, 2008

(54) PATH ESTIMATION AND CONFIDENCE LEVEL DETERMINATION SYSTEM FOR A VEHICLE

(75) Inventors: Wilford Trent Yopp, Canton, MI (US);
Anthony G. King, Ann Arbor, MI (US);
Yusheng Li, Troy, MI (US); Corinne D. Mentell, Louisville, KY (US)

(73) Assignee: Ford Global Technologies LLC, Dearborn, MI (US)

( * ) Notice: Subject to any disclaimer, the term of this patent is extended or adjusted under 35 U.S.C. 154(b) by 603 days.

(21) Appl. No.: 10/711,985

(22) Filed: Oct. 18, 2004

(65) Prior Publication Data

US 2006/0085131 A1    Apr. 20, 2006

(51) Int. Cl.
*G06F 17/10* (2006.01)
(52) U.S. Cl. ............ 701/301; 701/33; 701/34; 340/438
(58) Field of Classification Search ............ 701/29, 701/33, 34, 36, 301; 340/425.5, 438, 439, 340/903
See application file for complete search history.

(56) References Cited

U.S. PATENT DOCUMENTS

| | | | |
|---|---|---|---|
| 6,104,336 A * | 8/2000 | Curran et al. .......... 342/70 |
| 6,202,027 B1 | 3/2001 | Alland et al. | |
| 6,230,093 B1 | 5/2001 | Michi et al. | |
| 6,665,614 B2 | 12/2003 | Sekiguchi | |
| 6,988,026 B2 * | 1/2006 | Breed et al. .......... 701/29 |
| 2001/0053955 A1 | 12/2001 | Shirai et al. | |
| 2003/0070851 A1 | 4/2003 | Winner et al. | |
| 2003/0116373 A1 | 6/2003 | Miller et al. | |
| 2003/0149530 A1 * | 8/2003 | Stopczynski .......... 701/301 |
| 2003/0204298 A1 | 10/2003 | Ahmed-Zaid et al. | |

* cited by examiner

*Primary Examiner*—Gertrude Arthur Jeanglaud
(74) *Attorney, Agent, or Firm*—Frank MacKenzie

(57) ABSTRACT

A path prediction system (10) for a vehicle (12) includes vehicle state sensors (18) that generate vehicle state signals. A tracking sensor (20) generates a path characteristic signal. A path prediction module (16) determines predicted path estimations in response to data received from each of the vehicle state sensors (18) and the tracking sensor (20). The path prediction module (16) determines a resultant predicted future path and a path confidence level in response to the predicted path estimations. A controller (14) performs a countermeasure (26) in response to the resultant predicted future path and the path confidence level.

20 Claims, 2 Drawing Sheets

US 7,447,592 B2

PATH ESTIMATION AND CONFIDENCE LEVEL DETERMINATION SYSTEM FOR A VEHICLE

RELATED APPLICATION

The present invention is related to U.S. patent application Ser. No. 10/711,987, entitled "Feature Target Selection for Countermeasure Performance within a Vehicle," which is incorporated herein by reference.

TECHNICAL FIELD

The present invention relates to vehicle collision warning and countermeasure systems and more particularly, to a system and method of estimating and predicting the future path of a vehicle.

BACKGROUND OF THE INVENTION

Various sensing systems currently exist for performing collision warning and countermeasure system operations, such as detection, classification, tracking, and relative distance and velocity estimation of objects within close proximity of a host vehicle. Sensing systems also exist for performing other sensing system operations, such as windshield wiper and defogger operations, occupant sensing, classification, and tracking operations, and adaptive cruise control operations.

Collision warning and countermeasure systems operations include providing a vehicle operator knowledge and awareness of vehicles and objects that are within close proximity of the host vehicle to prevent colliding with those objects. Countermeasure systems exist in various passive and active forms. Some countermeasure systems are used to aid in the prevention of a collision, others are used to aid in the prevention of an injury to a vehicle occupant.

Certain collision warning and countermeasure systems are able to detect, identify, and classify an object within close proximity of the host vehicle and warn the host vehicle operator, such that the operator can take precautionary steps to prevent a collision or injury. Other collision warning and countermeasure systems activate passive or active countermeasures such as airbags, load limiting seatbelts, or brake control whereby the system itself aids in the prevention of a collision or an injury.

Countermeasure systems may be used to detect occupant characteristics and to determine which safety system countermeasures to perform and the times and rates of the countermeasures in response to those characteristics. Example restraint countermeasures that may be enabled are seat belt pretensioners and airbags. Occupant characteristics may include occupant positions within a seat, occupant size and weight, or other known occupant characteristics.

Some countermeasure systems incorporate external sensors for the detection of road and lane markings information, which can be used for vehicle position determination and future path prediction. The path prediction information may be utilized to perform countermeasures.

It is desirable to improve performance of existing countermeasure systems. As an example, it is desirable to improve the accuracy of countermeasure system path prediction and to have knowledge as to the extent of that accuracy for improved countermeasure activation, determination, and operation. Thus, there exists a need for an improved countermeasure system.

SUMMARY OF THE INVENTION

The present invention provides a path prediction system for a vehicle that includes vehicle state sensors. The vehicle state sensors generate vehicle state signals. A tracking sensor generates a path characteristic signal. A path prediction module determines predicted path estimations in response to data received from each of the vehicle state sensors and the tracking sensor. The path prediction module determines a resultant predicted future path and a path confidence level in response to the predicted path estimations. A controller performs a countermeasure in response to the resultant predicted future path and the path confidence level.

The embodiments of the present invention provide several advantages. One such advantage is the provision of a path prediction system that estimates the future path of a vehicle and provides a confidence level corresponding to that estimation. In determining a confidence level the path prediction system determines the accuracy of that estimation and is better capable of determining whether to perform a countermeasure or other safety system task and the manner in which that countermeasure or safety system task is performed.

Another advantage provided by an embodiment of the present invention is the provision of a path prediction system that generates multiple estimations of the future path of a vehicle. Each estimation is generated in response to the data received from multiple vehicle state sensors and path-tracking sensors. The more agreement there is among the estimations, or the more alike the estimations are, the higher the confidence level associated with a resultant future path estimation is.

The above-stated advantages provide improved path prediction determination, which in turn improves the system performance of countermeasures.

The present invention itself, together with attendant advantages, will be best understood by reference to the following detailed description, when taken in conjunction with the accompanying drawing figures.

BRIEF DESCRIPTION OF THE DRAWINGS

For a more complete understanding of the invention, reference should be made to the embodiments illustrated in greater detail in the accompanying drawing figures, and also described below by way of examples of the invention, wherein.

DETAILED DESCRIPTION

While the present invention is described with respect to a system and method of estimating and predicting the future path of a vehicle, the present invention may be adapted to be used in various applications and systems including: collision warning systems, collision avoidance systems, parking-aid systems, reversing-aid systems, passive countermeasure systems, adaptive cruise control systems, lane departure systems, lane-keeping systems, windshield clearing systems, or other systems known in the art. The present invention may be used to supplement a pre-collision sensing system.

In the following description, various operating parameters and components are described for multiple constructed embodiments. These specific parameters and components are included as examples and are not meant to be limiting.

Additionally, in the following description, the term "performing" may include activating, deploying, initiating, powering, and other terms known in the art that may describe the manner in which a countermeasure or a comfort and convenience feature may be operated.

As well, in the following description, various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Furthermore, a countermeasure signal may include information pertaining to the above-stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

In addition, the term "object" may refer to any animate or inanimate object. An object may be a vehicle, a pedestrian, a lane marker, a road sign, a roadway lane designating line, a vehicle occupant, window moisture, or other object known in the art.

Moreover, the term "feature" refers to any monitoring system, pre-collision system, countermeasure control system, collision detection system, collision mitigation system, occupant or pedestrian protection system, or other related system known in the art. Some example features are an adaptive cruise control system, a forward collision warning system, a rearward collision warning system, a side collision warning system, a collision mitigation by braking system, an airbag system, a seatbelt control system, and a pedestrian protection system. Features can be both related to comfort and convenience of the driver and passengers or related to their safety. Features often command the operation of one or more countermeasures sequentially or simultaneously.

Figure 1:
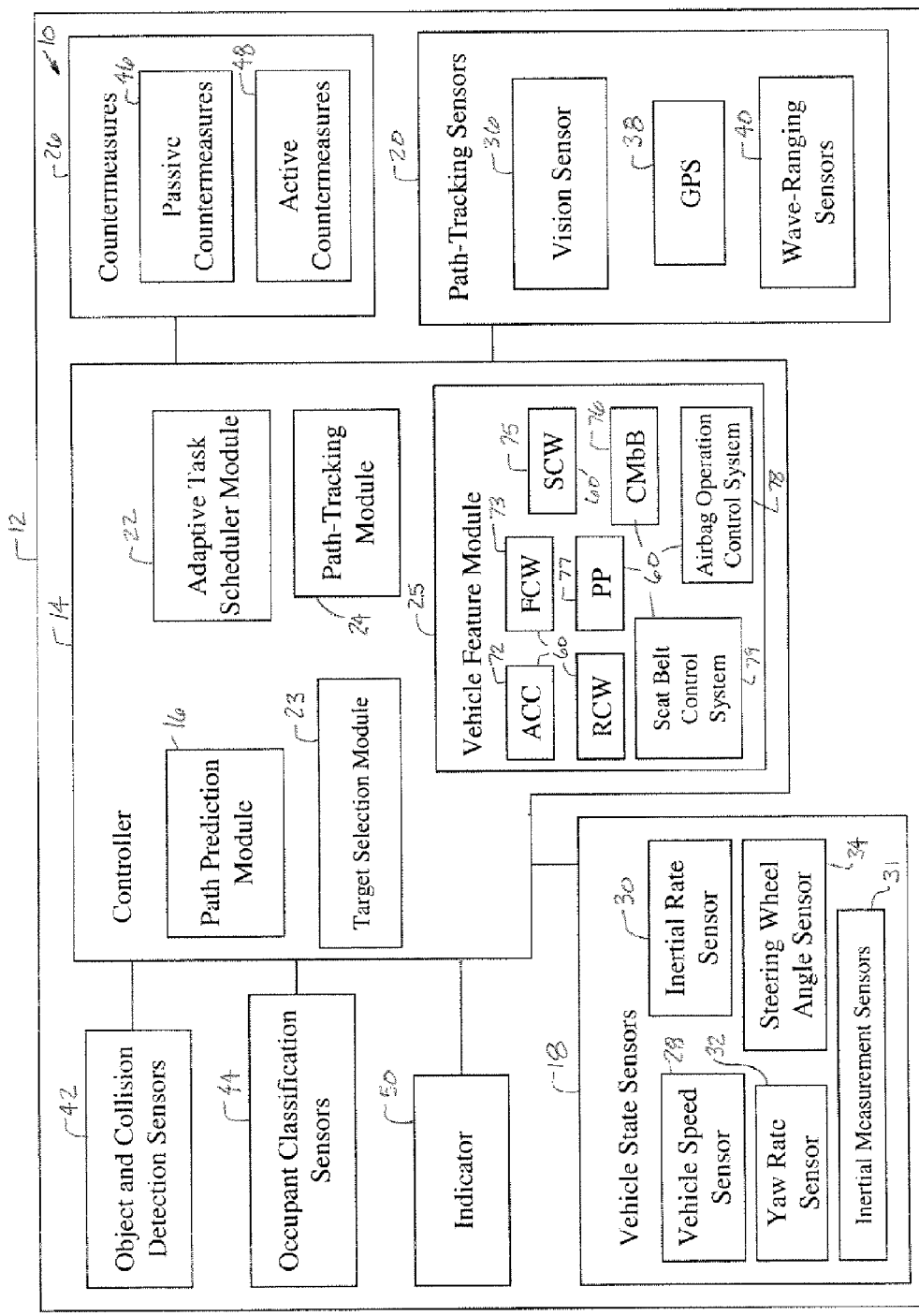
FIG. 1 is a block diagrammatic view of a collision warning and countermeasure system for a vehicle in accordance with an embodiment of the present invention.

Referring now to FIG. 1, a block diagrammatic view of a collision warning and countermeasure system 10 for a vehicle 12 in accordance with an embodiment of the present invention is shown. The countermeasure system 10 includes a controller 14 with a path prediction module 16, vehicle state sensors 18, and path-tracking sensors 20. The path prediction module 16 estimates the future path of the vehicle 12 in response to data received from vehicle state sensors 18 and the path-tracking sensors 20.

The controller 14 includes the adaptive task scheduler module 22, the path prediction module 16, the target selection module 23, the path-tracking module 24, and the vehicle feature module 25. The task scheduler 22 determines image-processing tasks to perform in a current update cycle. Task signals are generated and any remaining tasks not performed in the current update cycle are compiled for the next or upcoming update cycle. The path prediction module 16 estimates a driver intended path or future path of the vehicle 12 along with a confidence level in that estimation. The path-tracking module 24 is used to estimate and determine the future lane or road of travel of the vehicle 12 and generates a predicted future path signal, as well as an associated confidence level, which are described in greater detail below. The target selection module 23 selects targets associated with the vehicles features 60 and generates a selected target signal for use by the vehicle features 60. The vehicle features module 25 determines which countermeasures to activate and generates a countermeasure command signal in response to the selected target signal from the target selection module 23. One or more countermeasure command signals may be generated based on the number of features that receive a selected target signal. The countermeasure command signals are used by the countermeasures 26 to activate various countermeasures. The vehicle features 60 may include an adaptive cruise control (ACC) system 72, a forward collision warning (FCW) system 73, a rearward collision warning (RCW) system 74, a side collision warning (SCW) system 75, a collision mitigation by braking (CMbB) system 76, a pedestrian protection (PP) system 77, an airbag operation control system 78, a seatbelt control system 79, as well as other features known in the art.

The controller 14 may perform various different sensing based safety and comfort and convenience feature operations including countermeasure control, adaptive cruise control, lane-keeping control, lane-departure control, window clearing control, collision avoidance control, airbag control, seat belt control, or other feature operations known in the art. The controller 14 may also perform the countermeasures related to these features. The operations may be performed sequentially or simultaneously.

The controller 14 through the use of the task scheduler 22 determines which of the sensing system operations to perform. The controller 14 while performing one or more of the sensing system operations may determine whether to perform one or more of the countermeasures 26 and indicate to the vehicle operator various object and vehicle status information. Depending upon relative positions, velocities, and accelerations of the detected objects, the controller 14 may also determine whether to indicate to the vehicle operator of a potential collision or may perform a countermeasure, as needed. Countermeasures are performed to prevent a collision, mitigate a potential injury, and prevent the vehicle 12 from traveling outside a current lane of travel. The controller 14 may be microprocessor based such as a computer having a central processing unit, memory (RAM and/or ROM), and associated input and output buses. The controller 14 may be an application-specific integrated circuit or be formed of other logic devices known in the art. The controller 14 may be a portion of a central vehicle main control unit, an interactive vehicle dynamics module, a restraints control module, a main safety controller, or may be a stand-alone controller as shown.

The vehicle state sensors 18 generate vehicle state signals that correspond to the current state of the vehicle 12. The vehicle state sensors 18 may include a vehicle speed sensor 28, an inertial rate sensor 30, a yaw rate sensor 32, a steering wheel angle sensor 34, an inertial measurement sensors 31, or various other vehicle state sensors known in the art. The inertial rate sensor 30 may include rotational sensors located on and indicative of a characteristic of an engine, a transmission, an axle, a wheel, or other component or device of the vehicle 12. The inertial measurement sensors 31 may include linear accelerometers, lateral accelerometers, velometers, and angle rate sensors. The vehicle state sensors 18 may be part of a vehicle component or device or may be standalone sensors.

The external path-tracking sensors 20 are used to detect and track lanes, roads, and markings thereon. The external path-tracking sensors 20 may include vision sensors 36, such as cameras, or may be in some other form known in the art. The external path-tracking sensors 20 may include a global positioning system (GPS) 38 with road map data and provide present and upcoming road curvature, speed limits, and other information that may indicate a future vehicle path. Scene-tracking is performed by wave-ranging sensors 40, which detect objects such as, for example, guardrails or a series of parked cars along the edge of a roadway.

The countermeasure system 10 also includes object and collision detection sensors 42 and occupant classification sensors 44. The object and collision detection sensors 42 monitor an environment exterior to the vehicle 12 and generate object detection signals upon detection of an object and collision detection signals upon the detection of a collision. The occupant classification sensors 44 monitor interior areas of the vehicle 12 and generate occupant classification signals in response to the presence and characteristics of occupants therein. The occupant characteristics may include occupant positioning within a seat, occupant positioning within the cabin, occupant size, shape, weight, or other known occupant characteristics.

The object and collision detection sensors 42 and the occupant classification sensors 44 may be infrared, vision, ultrasonic, radar, active electro-magnetic wave-ranging, or lidar based or may be in the form of an accelerometer, a piezo electric sensor, a piezo resistive sensor, a charged-coupled device, a series of photodiodes, or in some other form known in the art. Vision sensors may refer to robotic cameras or other visual imaging cameras. The vision sensors may be monocular or binocular and may be used to obtain height, width, depth, range, range rate, angle, and any other visual feature information. The object and collision detection sensors 42 and the occupant classification sensors 44 may also be in the form of a pressure sensor or a strain gage. The object and collision detection sensors 42 and the occupant classification sensors 44 may be in various locations on the vehicle and any number of each may be utilized.

The controller 14 may enable various countermeasures 26 including passive countermeasures 46 and active countermeasures 48 in response to the object detection signals and the path estimations. The controller 14 as part of a countermeasure may generate a warning signal and communicate the warning signal to vehicle occupants via the indicator 50.

The passive countermeasures 46 may include internal air bag control, seatbelt control, knee bolster control, head restraint control, load limiting pedal control, load limiting steering control, pretensioner control, external air bag control, pedestrian protection control, and other passive countermeasures known in the art. Air bag control may include control over front, side, curtain, hood, dash, or other type of airbags known in the art. Pedestrian protection may include a deployable vehicle hood, a bumper system, or other pedestrian protective devices.

The active countermeasures 48 may include brake control, throttle control, steering control, suspension control, transmission control, and other vehicle control systems. The controller 14 may signal the vehicle operator via the indicator 50 of an impending potential collision so that the vehicle operator may actively perform a precautionary action, such as applying the brakes or steering to prevent a collision.

The indicator 50 is used to signal or indicate a safety system signal, which may include a calibration signal, an occupant classification sensor related signal, a warning signal, a collision-warning signal, a countermeasure signal, or an object identification signal in response to the object detection signals. The indicator 50 may include a video system, an audio system, an LED, a light, a global positioning system, a heads-up display, a headlight, a taillight, a display system, a telematic system, or other indicator known in the art. The indicator 50 may supply warning signals, collision-related information, lane departure and lane-keeping information, external-warning signals to objects or pedestrians located outside of the vehicle 12, or other pre and post collision information.

Figure 2:
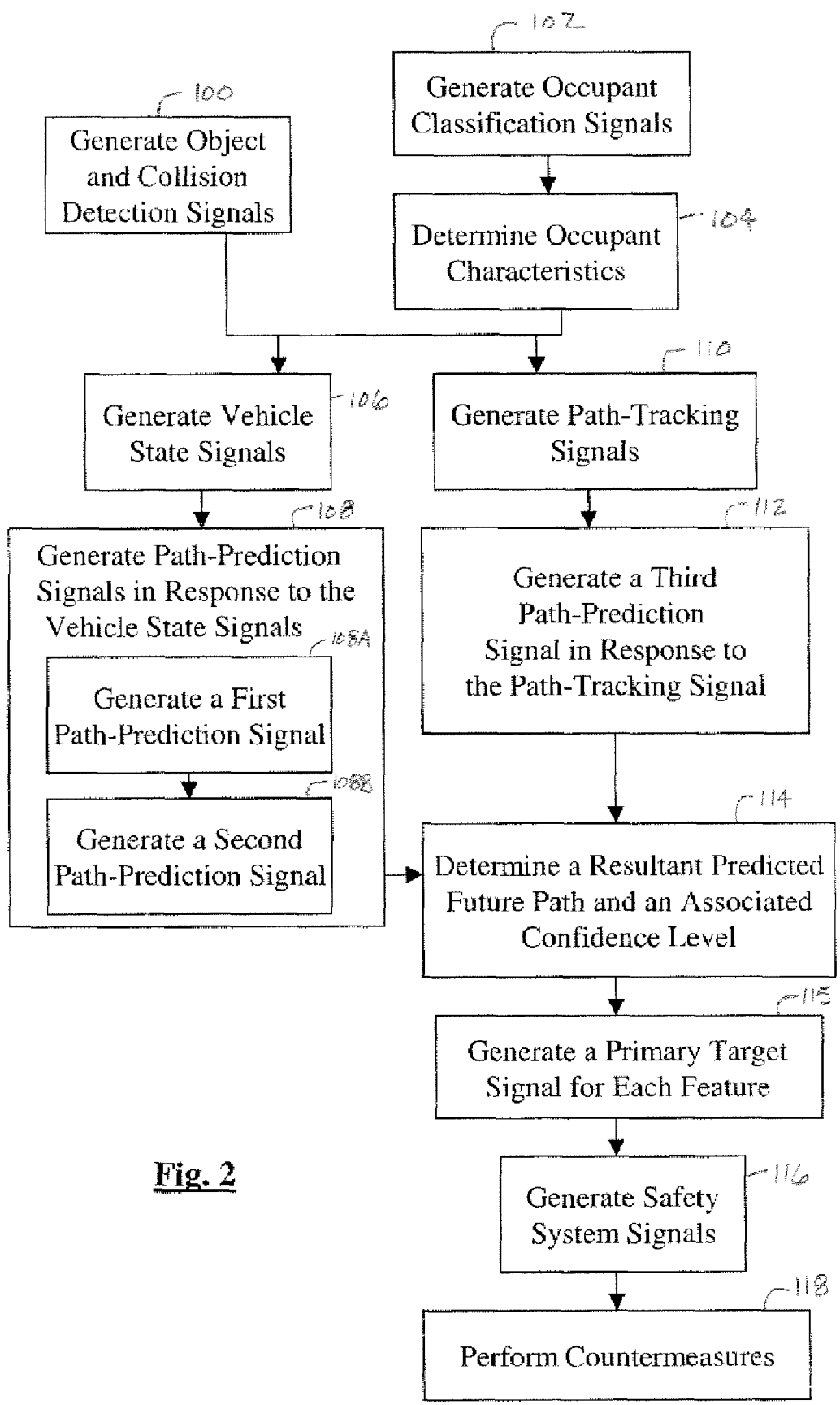
FIG. 2 is a logic flow diagram illustrating a method of performing a countermeasure within a vehicle in accordance with an embodiment of the present invention.

Referring now to FIG. 2, a method of performing countermeasures within the vehicle 12 in accordance with an embodiment of the present invention is shown.

In step 100, the object and collision detection sensors 42 generate multiple object detection signals corresponding to the detection of objects within areas external to the vehicle 12. In one embodiment of the present invention, one or more cameras are used to determine height, width, angle, and visual feature information and wave-ranging devices are use to determine the range, range rate, and angle information of an object. The wave-ranging devices 40 generate a first object detection signal upon detecting a target object in the sensor field-of-view. The first object detection signal contains range, range rate, and angle information of the target object. Target object information, such as visual cues and features, is also obtainable from the first object detection signal. The cameras generate a second object detection signal for the same target object, which contains object height, width, and angle information. Target object information, such as visual cues and features is also obtainable from the second object detection signal.

In step 102, the occupant classification sensors 44 generate occupant classification signals.

In step 104, the controller 14 determines occupant characteristics, such as size, weight, height, and seat position, in response to the occupant classification signals. In determining occupant characteristics the controller 14 may also determine whether a child safety seat is located within a vehicle seat or whether a vehicle seat belt is being utilized.

In step 106, the vehicle state sensors 18, as commanded by the adaptive task scheduler 22, generate vehicle state signals including a current vehicle speed, a current steering wheel angle, a current yaw rate, and a current lateral acceleration of the vehicle 12.

In step 108, the path prediction module 16, as commanded by the adaptive task scheduler 22, generates multiple predicted path estimations in the form of path prediction signals in response to the vehicle state signals. In step 108A, the path prediction module 16 generates a first path prediction signal in response to the current steering wheel angle and the current vehicle speed. The steering wheel angle provides information related to the driver intended direction of travel and to the degree of turning radius of the vehicle 12. A predicted path may be determined in response to the change in steering wheel angle position and host vehicle speed. In step 108B, the path prediction module generates a second path prediction signal in response to the current vehicle speed, the current yaw rate, and the lateral acceleration. The yaw rate provides instantaneous radius of curvature of a vehicle path. The yaw rate may be determined using yaw rate information gathered from an adaptive cruise control system.

In step 110, the external path-tracking sensors 20, as commanded by the adaptive task scheduler 22, generate external path-tracking signals indicative of the current path of the vehicle 12. The external path-tracking signals provide information related to the roadway. In step 112, the path-tracking module 24, as commanded by the adaptive task scheduler 22, generates a third predicted path estimation or path prediction signal in response to the external path-tracking signals.

In steps 108 and 110, any number of path prediction signals may be generated and each path prediction signal may be generated in response to one or more vehicle sensors including the vehicle state sensors 18 and the external path-tracking sensors 20.

In step 114, the path prediction module 16 determines a resultant predicted future path and an associated confidence level. Through the convolution of steering wheel angle information, yaw rate information, external path-tracking information, and other related information, lane change and path prediction information can be accurately determined. The resultant path is determined in response to the preliminary path prediction signals or the first path prediction signal, the second path prediction signal, and the third path prediction signal. The preliminary path prediction signals are compared to generate the resultant path and to determine the confidence level or accuracy of that resultant path. When the preliminary path prediction signals are in agreement, or in other words, are approximately the same a high confidence level is assigned. The level of confidence is proportional to the agreement in the multiple path prediction signals. In one embodiment, when the preliminary path prediction signals are not in agreement then one of the preliminary prediction signals is selected. When one of the path prediction signals are selected a pre-determined criteria may be utilized. In another embodiment, when the preliminary path prediction signals are not in agreement then an average or center approximation between the preliminary path prediction signals is determined. An average, a median, a center point, a mean, an extrapolation, or other functional result may be utilized as the resultant path.

In step 115, the controller 14 generates a primary target signal for each feature in response to the object detection signals and predicted future path signal and predicted future path confidence level. Any target selection method known in the art may be performed in response to the object detection signals and the selected or resultant path. The target selection is based on selection rules that may be specific for each feature, and selects the target that is or are the most of concern and of interest to that feature. One such selection rule, for example may be for a feature to select its primary target for which it deems to be of highest threat, which may be the closest in-path target. Each feature may require its own independent definitions and prioritizations of its primary list of targets, which will be used to perform the target selection for that feature.

In step 116, the controller 14 generates multiple safety system signals in response to the object detection signals, the occupant classification signals, the resultant path, and the confidence level associated with that resultant path. The safety system signals may include not only countermeasures related signals, as stated above, but may also include signals related to other sensing system controls.

In step 118, the controller 14 may perform countermeasures in response to the safety system signals. The controller 14 may perform a countermeasure operation, a windshield clearing operation, a throttle and brake operation for the adaptive cruise control feature, or any of the other above-mentioned or known in the art sensing system operation in response to the safety system signals.

The above-described steps are meant to be illustrative examples; the steps may be performed sequentially, synchronously, simultaneously, or in a different order depending upon the application.

The present invention provides a method of determining a driver intended path and performing countermeasures in response to that determination. The present invention generates multiple future path estimations in response to multiple vehicle sensors and in response thereto determines a resultant predicted future path and a confidence level in the accuracy of that prediction, which allows for improved accuracy in performing countermeasures.

While the present invention has been described in association with one or more embodiments, it is to be understood that the specific mechanisms and techniques that have been described herein are merely illustrative of the principles of the invention, and that numerous modifications may be made to the methods and apparatus described herein without departing from the spirit and scope of the invention as defined by the appended claims.

What is claimed is:

1. A path prediction system for a vehicle, said path prediction system comprising:
    a plurality of vehicle state sensors for generating vehicle state signals;
    at least one path-tracking sensor for generating a path characteristic signal;
    a path prediction module and a path-tracking module for determining a plurality of predicted path estimations of a future path of said vehicle in response to data received from each of said plurality of vehicle state sensors and said at least one path-tracking sensor, said path prediction module being operable to determine a resultant predicted future path and a path confidence level in response to said plurality of predicted path estimations; and
    a controller for performing a countermeasure in response to said resultant predicted future path and said path confidence level.

2. A path prediction system as in claim 1, wherein said path confidence level corresponds with the accuracy of said resultant predicted future path.

3. A path prediction system as in claim 1, wherein said plurality of vehicle state sensors includes a vehicle speed sensor, an inertial rate sensor, a yaw rate sensor, a steering wheel angle sensor, or a combination thereof.

4. A path prediction system as in claim 1, wherein said at least one path-tracking sensor includes a sensor that is operable to both detect and track a road, a road lane, a road marking, or a combination thereof.

5. A path prediction system as in claim 1, wherein said at least one path-tracking sensor includes a vision sensor, a camera, a global positioning system sensor, a radar sensor, a lidar sensor, an ultrasonic sensor, an infrared sensor, a wave-ranging sensor device, or a combination thereof.

6. A path prediction system as in claim 1, wherein said path prediction system further comprises an adaptive task scheduler for determining processing tasks to perform, and said vehicle state sensors are operable to generate said vehicle state signals in response to said processing tasks.

7. A path prediction system as in claim 1, wherein said path prediction system further comprises an adaptive task scheduler for determining processing tasks to perform, and said path prediction module is operable to determine said resultant predicted future path and said path confidence level in response to said processing tasks.

8. A path prediction system as in claim 1, wherein said path prediction module is operable to assign a high confidence level to said resultant predicted future path when a majority of said predicted path estimations are in agreement.

9. A path prediction system as in claim 1, wherein said path prediction module is operable to select said resultant predicted future path from said plurality of predicted path estimations and assign a low level of confidence to the selection.

10. A path prediction system as in claim 1, wherein said path prediction module and said path-tracking module, for determining said plurality of predicted path estimations, are operable to respectively determine a first predicted path in response to data received from one of said vehicle state sensors and determine a second predicted path in response to data received from at least one said path-tracking sensor.

11. A path prediction system as in claim 10, wherein said path prediction module is operable to determine said resultant predicted future path and said path confidence level in response to said first predicted path and said second predicted path.

12. A path prediction system as in claim 10, wherein said path prediction module, for determining said plurality of predicted path estimations, is operable to determine a third predicted path in response to data received from a another one of said vehicle state sensors.

13. A path prediction system as in claim 12, wherein said path prediction module is operable to determine said resultant predicted future path and said path confidence level in response to said first predicted path and said third predicted path.

14. A path prediction system as in claim 1, wherein said path prediction module, for determining said plurality of predicted path estimations, is operable to determine a first predicted path in response to data received from one of said vehicle state sensors and also determine a second predicted path in response to data received from another one of said vehicle state sensors.

15. A path prediction system as in claim 1, wherein said path prediction module is operable to determine a substantially instantaneous position of said vehicle in response to said vehicle state signals and also determine both said resultant predicted future path and said path confidence level in response to said instantaneous position.

16. A method of performing a countermeasure onboard a vehicle, said method comprising the steps of:
  (a) operating vehicle state sensors to generate vehicle state signals;
  (b) operating a path-tracking sensor to generate a path characteristic signal;
  (c) operating a path prediction module and a path-tracking module to determine a plurality of predicted path estimations of a future path of said vehicle in response to data received from each of said vehicle state sensors and said path-tracking sensor;
  (d) operating said path prediction module to determine a resultant predicted future path and a path confidence level in response to said plurality of predicted path estimations and
  (e) operating a controller to perform a countermeasure in response to said resultant predicted future path and said path confidence level.

17. A method as in claim 16, wherein step (c) is at least partially accomplished by operating said path prediction module and said path-tracking module to respectively determine a first predicted path in response to data received from one of said vehicle state sensors and determine a second predicted path in response to data received from said path-tracking sensor.

18. A method as in claim 16, wherein step (c) is at least partially accomplished by operating said path prediction module to determine a first predicted path in response to data received from one of said vehicle state sensors and also determine a second predicted path in response to data received from another one of said vehicle state sensors.

19. A path prediction system for a vehicle, said path prediction system comprising:
  a plurality of vehicle state sensors for generating vehicle state signals;
  at least one path-tracking sensor for generating a path characteristic signal;
  a path prediction module and a path-tracking module for determining a plurality of predicted path estimations of a future path of said vehicle in response to data received from each of said plurality of vehicle state sensors and said at least one path-tracking sensor, said path prediction module being operable to compare said plurality of predicted path estimations and also determine a resultant predicted future path and a path confidence level in response to the comparison; and
  a controller for performing a countermeasure in response to said resultant predicted future path and said path confidence level.

20. A path prediction system as in claim 19, wherein said path prediction module, for comparing said plurality of predicted path estimations, is operable to determine an average, a median, an approximate center point, a mean, an extrapolation, a functional result, or a combination thereof of said plurality of predicted path estimations.

* * * * *